(12) United States Patent
Fontes et al.

(10) Patent No.: US 8,255,381 B2
(45) Date of Patent: *Aug. 28, 2012

(54) EXPANDED TEXT EXCERPTS

(75) Inventors: Paul Fontes, Mountain View, CA (US);
Alexis Battle, Palo Alto, CA (US);
Corin Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,316

(22) Filed: Oct. 27, 2011

(65) Prior Publication Data

US 2012/0042231 A1    Feb. 16, 2012

Related U.S. Application Data

(63) Continuation of application No. 11/394,192, filed on Mar. 31, 2006, now Pat. No. 8,073,830.

(51) Int. Cl.
*G06F 17/30* (2006.01)

(52) U.S. Cl. ...................................... 707/706

(58) Field of Classification Search .................. 707/706, 707/999.3; 708/707
See application file for complete search history.

(56) References Cited

U.S. PATENT DOCUMENTS

| | | | |
|---|---|---|---|
| 6,252,597 B1 | 6/2001 | Lokuge | |
| 6,535,888 B1 * | 3/2003 | Vijayan et al. | 707/706 |
| 6,594,670 B1 | 7/2003 | Genser | |
| 6,763,351 B1 | 7/2004 | Subramaniam et al. | |
| 6,785,670 B1 * | 8/2004 | Chiang et al. | 707/706 |
| 6,961,731 B2 * | 11/2005 | Holbrook | 1/1 |
| 7,076,743 B2 | 7/2006 | Ingram et al. | |
| 7,162,493 B2 * | 1/2007 | Weiss et al. | 1/1 |
| 7,228,506 B2 | 6/2007 | Ivanovic et al. | |
| 7,299,222 B1 | 11/2007 | Hogan et al. | |
| 7,493,315 B2 | 2/2009 | Holbrook | |
| 7,725,405 B2 | 5/2010 | Johnson | |
| 8,041,709 B2 | 10/2011 | Permandla et al. | |
| 2002/0010623 A1 | 1/2002 | McCollom et al. | |
| 2002/0042799 A1 | 4/2002 | Slotznick | |
| 2002/0118214 A1 | 8/2002 | Card et al. | |
| 2002/0194162 A1 | 12/2002 | Rios et al. | |
| 2003/0046259 A1 | 3/2003 | Manrique et al. | |
| 2003/0146937 A1 | 8/2003 | Lee | |

(Continued)

FOREIGN PATENT DOCUMENTS

WO    WO 02/19172 A1    3/2002

(Continued)

OTHER PUBLICATIONS

European Search Report corresponding to EP 07 759 675, mailed Oct. 5, 2011, 7 pages.

(Continued)

*Primary Examiner* — Robert Beausoliel, Jr.
*Assistant Examiner* — Noosha Arjomandi
(74) *Attorney, Agent, or Firm* — Harrity & Harrity, LLP

(57) ABSTRACT

A system provides a list of search results, where one of the search results in the list of search results includes a snippet from a corresponding search result document. The system receives selection of the snippet and provides an expanded snippet based on the selection of the snippet. The expanded snippet includes the snippet and other text from a subset of the search result document.

21 Claims, 9 Drawing Sheets

U.S. PATENT DOCUMENTS

| | | | |
|---|---|---|---|
| 2003/0146939 | A1 | 8/2003 | Petropoulos et al. |
| 2004/0205638 | A1 | 10/2004 | Thomas et al. |
| 2005/0278314 | A1 | 12/2005 | Buchheit |
| 2006/0069670 | A1 | 3/2006 | Khaliq et al. |
| 2006/0074868 | A1* | 4/2006 | Khaliq et al. ............. 707/3 |
| 2006/0095424 | A1 | 5/2006 | Petropoulos et al. |
| 2006/0173824 | A1 | 8/2006 | Bensky et al. |
| 2006/0200455 | A1 | 9/2006 | Wilson |
| 2006/0248078 | A1* | 11/2006 | Gross et al. ............. 707/5 |
| 2006/0294476 | A1 | 12/2006 | Buckley |
| 2007/0239662 | A1 | 10/2007 | Fontes et al. |
| 2008/0071739 | A1* | 3/2008 | Kumar et al. ............. 707/3 |
| 2009/0043689 | A1 | 2/2009 | Yang et al. |
| 2009/0307188 | A1 | 12/2009 | Oldham et al. |

FOREIGN PATENT DOCUMENTS

| | | |
|---|---|---|
| WO | WO 2006/001920 A1 | 1/2006 |
| WO | WO 2007/059503 A1 | 5/2007 |

OTHER PUBLICATIONS

B. Ulincy, "Lycos Retriever: An Information Fusion Engine," Versatile Information System, Inc., 4 pages, 2006.

International Preliminary Report on Patentability issued in corresponding international application No. PCT/US2006/060906, May 29, 2008, 8 pages.

X. Li et al., "Search Engine: Principles, Techniques and Systems," Science Publishing House, Apr. 2005, 19 pages. (English description included).

Browster; "Browse Search Results Instantly!"; www.browster.com; Mar. 16, 2006 (print date); 8 pages.

Ask.com; "Binoculars FAQ"; http://websearch.about.com; Mar. 22, 2006 (print date); 3 pages.

International Preliminary Report on Patentability issued in corresponding international application No. PCT/US2007/065472, mailed Oct. 9, 2008, 7 pages.

Dieberger et al. "Exploratory Navigation in Large Multimedia Documents Using Contact Lenses," System Sciences, 2001. HICSS. Proceedings of the 35$^{th}$ Annual Hawaii International Conference on Jan. 7-10, 2001, Piscataway, NJ, USA, IEEE, Jan. 7, 2001, pp. 1462-1468.

Jones et al.; "Interactive Document Summarisation Using Automatically Extracted Keyphrases," Proceedings of the 35$^{th}$ Annual Hawaii International Conference on System Sciences; Jan. 7-10, 2001; 10 pages.

Written Opinion and International Search Report for corresponding PCT application; dated Sep. 17, 2007; 13 pages.

D. Farber, "Browsing at 2x Normal Speed"; http://blogs.zdnet.com/BTL; Feb. 14, 2005; 2 pages.

Office Action from corresponding U.S. Appl. No. 12/084,957 mailed Dec. 7, 2011, 56 pages.

* cited by examiner

EXPANDED TEXT EXCERPTS

RELATED APPLICATION

This application is a continuation of U.S. patent application Ser. No. 11/394,192, filed Mar. 31, 2006, the contents of which are incorporated herein by reference.

BACKGROUND

1. Field of the Invention

Implementations described herein relate generally to information retrieval and, more particularly, to the providing of additional information in regard to a search result.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results.

Oftentimes, the search results include three pieces of information, such as a title, a snippet, and a link. The title identifies the corresponding web page. The snippet includes a small portion of the web page that often contains one or more of the search terms of the search query. Typically, the snippet includes no more than a sentence worth of text and might include one or more partial sentences. The link includes the address of the web page.

Users often use the snippets in determining which search result(s) to select. Because of the short length of the snippet, however, the snippet may not provide enough information for a user to make a meaningful decision regarding which search result(s) to select.

SUMMARY

According to one aspect, a method may include providing a list of search results, where a search result in the list of search results may include a text excerpt from a corresponding search result document; receiving selection of the text excerpt; and providing an expanded text excerpt based on the selection of the text excerpt, where the expanded text excerpt may include the text excerpt and additional text from the search result document but less than all of the text in the search result document.

According to another aspect, a system may include means for providing a list of search results, where a search result in the list of search results may include a snippet from a corresponding search result document; means for receiving selection of the snippet; and means for providing an expanded snippet based on the selection of the snippet, where the expanded snippet may include the snippet and other text from a subset of the search result document.

According to yet another aspect, a system may include a memory to store instructions and a processor to execute the instructions to present a list of search results. A search result in the list of search results may include a text excerpt from a corresponding search result document. The processor may determine a selection of the text excerpt and present an expanded text excerpt based on the selection of the text excerpt. The expanded text excerpt may include the text excerpt and additional text located in proximity to the text excerpt in the search result document. The additional text may comprise a portion of the search result document.

According to a further aspect, a method may include receiving a search query; performing a search based on the search query to identify multiple search result documents; forming a list of search results based on the search result documents, where at least a subset of the search results may include a text excerpt from a corresponding subset of the search result documents; and providing the list of search results. The method may also include receiving a request for an expanded text excerpt in connection with one of the search results; generating the expanded text excerpt, where the expanded text excerpt may include the text excerpt and text in proximity to the text excerpt in the corresponding one of the search result documents, and the text may comprise a portion of the corresponding one of the search result documents; and providing the expanded text excerpt.

According to another aspect, a method may include receiving a search query; performing a search based on the search query to identify multiple search result documents; and forming a list of search results based on the search result documents, where at least a subset of the search results may include a text excerpt from a corresponding subset of the search result documents. The method may also include generating an expanded text excerpt for at least one of the search results, where the expanded text excerpt may include the text excerpt and text in proximity to the text excerpt in the corresponding one of the search result documents, and the text may comprise a portion of the corresponding one of the search result documents; and providing the list of search results and the expanded text excerpt.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Implementations consistent with principles of the invention may selectively provide context information associated with a snippet of a search result document. The context information may include text that occurs before and/or after the snippet in the search result document. This text may provide context to the snippet and, thus, make the snippet more meaningful to a user.

Figure 1:
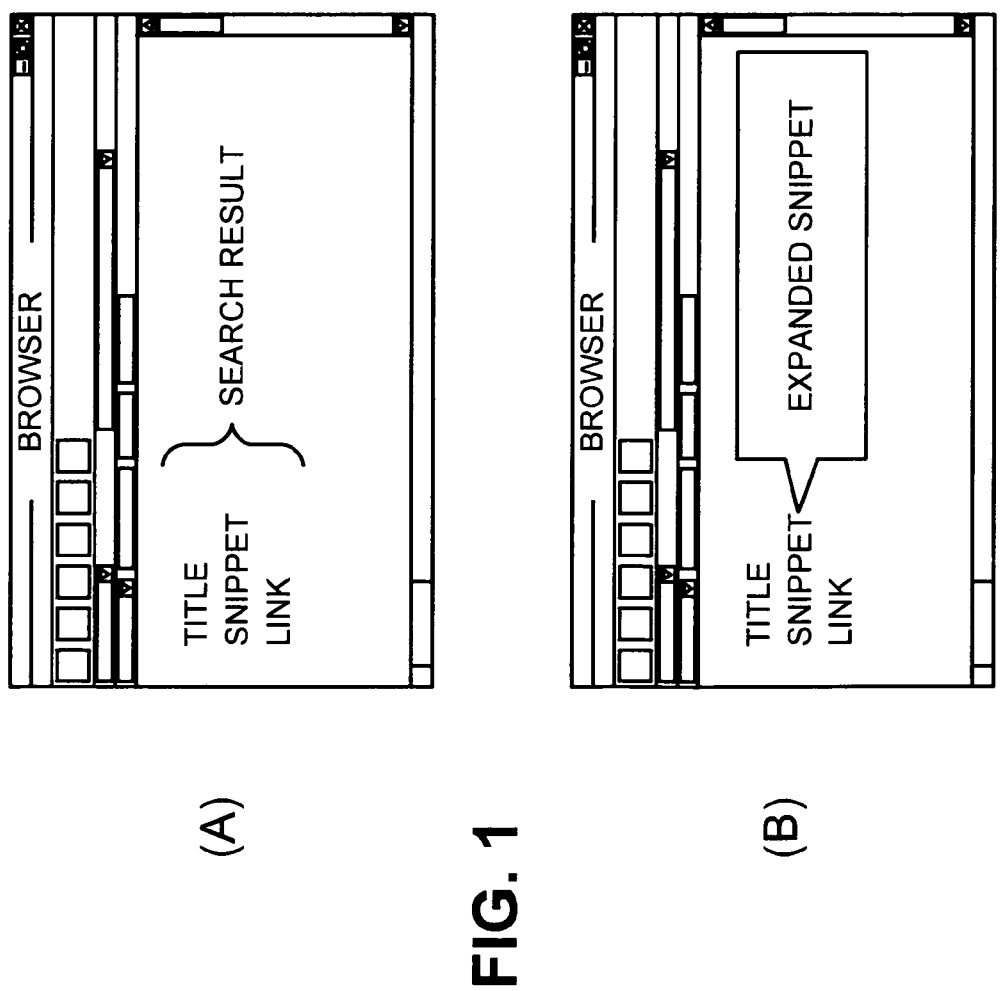
FIG. 1 is an exemplary diagram illustrating a concept consistent with principles of the invention.

FIG. 1 is an exemplary diagram illustrating a concept consistent with the principles of the invention. As shown at (A), a user may obtain search results by, for example, providing a search query to a search engine for performance of a search and receiving the results of the search. The search may be performed based on documents stored at a local computer or stored at one or more locations in a local network or a wide area network, such as the Internet. A single search result is shown at (A). The search result may include a title, a snippet, and a link.

If the user desires additional information regarding the snippet, the user may select the snippet using, for example, a pointing device, such as a mouse. As shown at (B), an expanded snippet may be presented to the user in response to the user selecting the snippet. The expanded snippet may provide context for the snippet by providing text of the snippet and text that occurs before and/or after the snippet in the search result document. The expanded snippet may permit the user to make a more meaningful decision of whether to retrieve the entire search result document.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
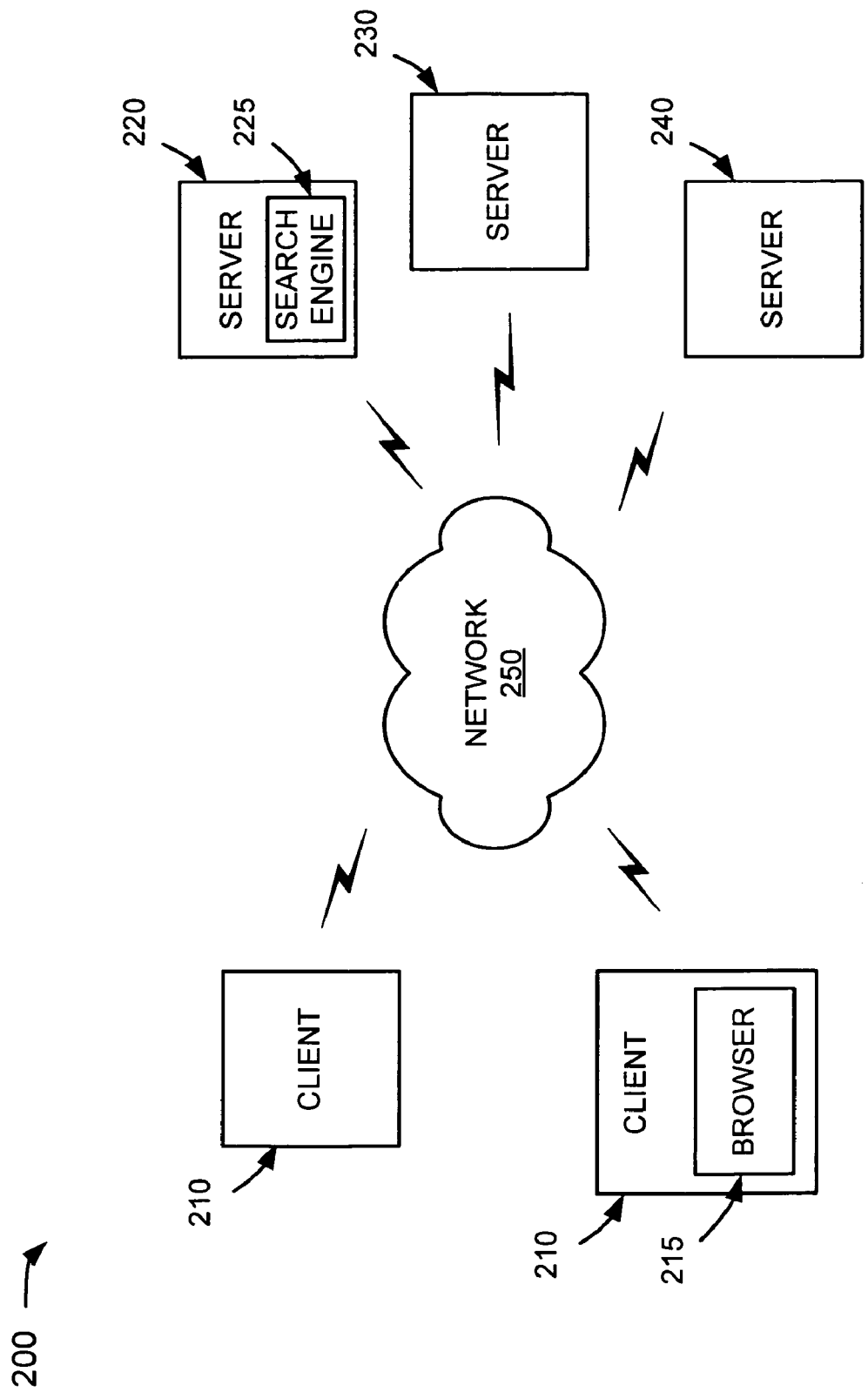
FIG. 2 is an exemplary diagram of a network in which systems and methods consistent with principles of the invention may be implemented.

FIG. 2 is an exemplary diagram of a network 200 in which systems and methods consistent with principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices.

In one implementation, a client 210 may include a browser 215. Browser 215 may permit a user to access documents and may provide an interface to a search engine. Browser 215 may permit a user to interact with the search engine to perform local (e.g., local drive, local database, local network, etc.) and/or non-local (e.g., remote database or network, wide area network, etc.) searches. Browser 215 may include a browser assistant that may take the form of an add-on toolbar or some other functionality that may operate separate from, but in conjunction with, browser 215. In another implementation, the browser assistant may be integrated as part of browser 215. In either case, the browser assistant may operate as an interface between browser 215 and network 250.

Servers 220-240 may include server entities that gather, process, search, and/or maintain documents in a manner consistent with the principles of the invention. In an implementation consistent with principles of the invention, server 220 may include a search engine 225 usable by clients 210. Server 220 may crawl a corpus of documents, index the documents, and store information associated with the documents in a repository of documents. Search engine 225 may execute a search using a query, received from a user at a client 210, on the corpus of documents stored in the repository of documents.

Servers 230 and 240 may store or maintain documents that may be crawled or analyzed by server 220. Such documents may include data related to published news stories, products, images, user groups, geographic areas, or any other type of data. For example, servers 230 and 240 may store or maintain news stories from any type of news source, such as, for example, the Washington Post, the New York Times, Time magazine, or Newsweek. As another example, servers 230 and 240 may store or maintain data related to specific products, such as product data provided by one or more product manufacturers. As yet another example, servers 230 and 240 may store or maintain data related to other types of web documents, such as pages of web sites.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
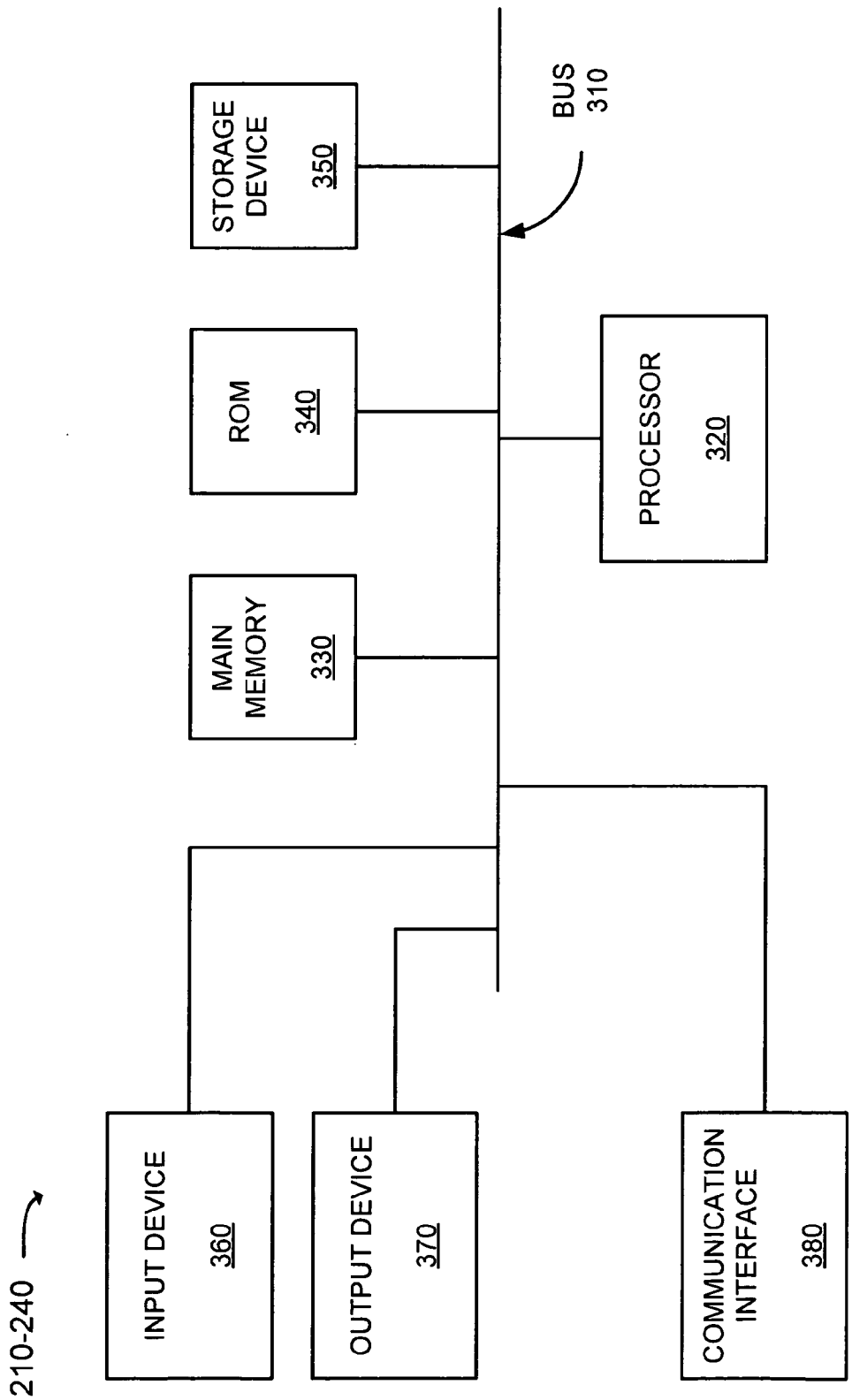
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with principles of the invention, may perform certain operations relating to the presentation of search results. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4:
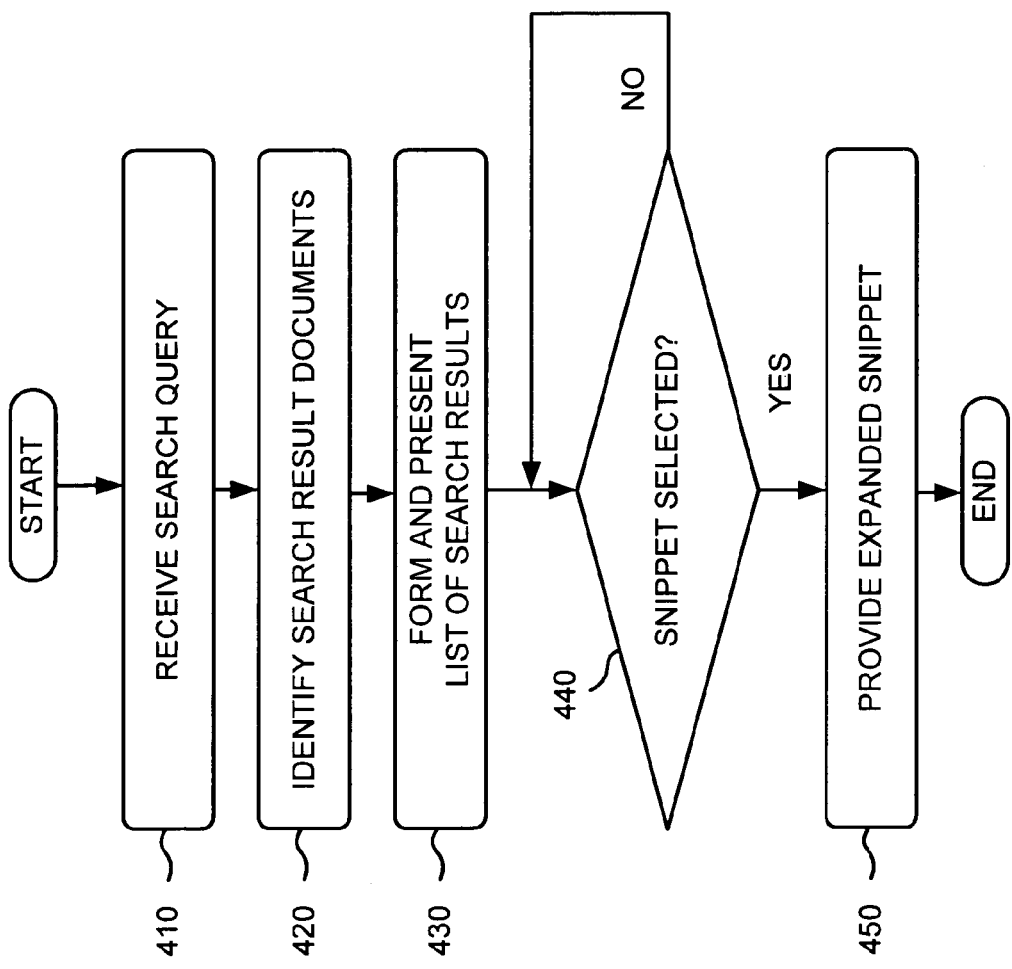
FIG. 4 is a flowchart of exemplary processing for presenting search result information according to an implementation consistent with principles of the invention.

FIG. 4 is a flowchart of exemplary processing for presenting search result information according to an implementation consistent with the principles of invention. In one implementation, the processing of FIG. 4 may be performed by one or more software and/or hardware components within server 220, client 210, or a combination of server 220 and client 210. In another implementation, the processing may be performed by one or more software and/or hardware components within another device or a group of devices separate from or including server 220 and/or client 210. FIGS. 5-9 are exemplary diagrams of information that may be presented to a user.

Figure 5:
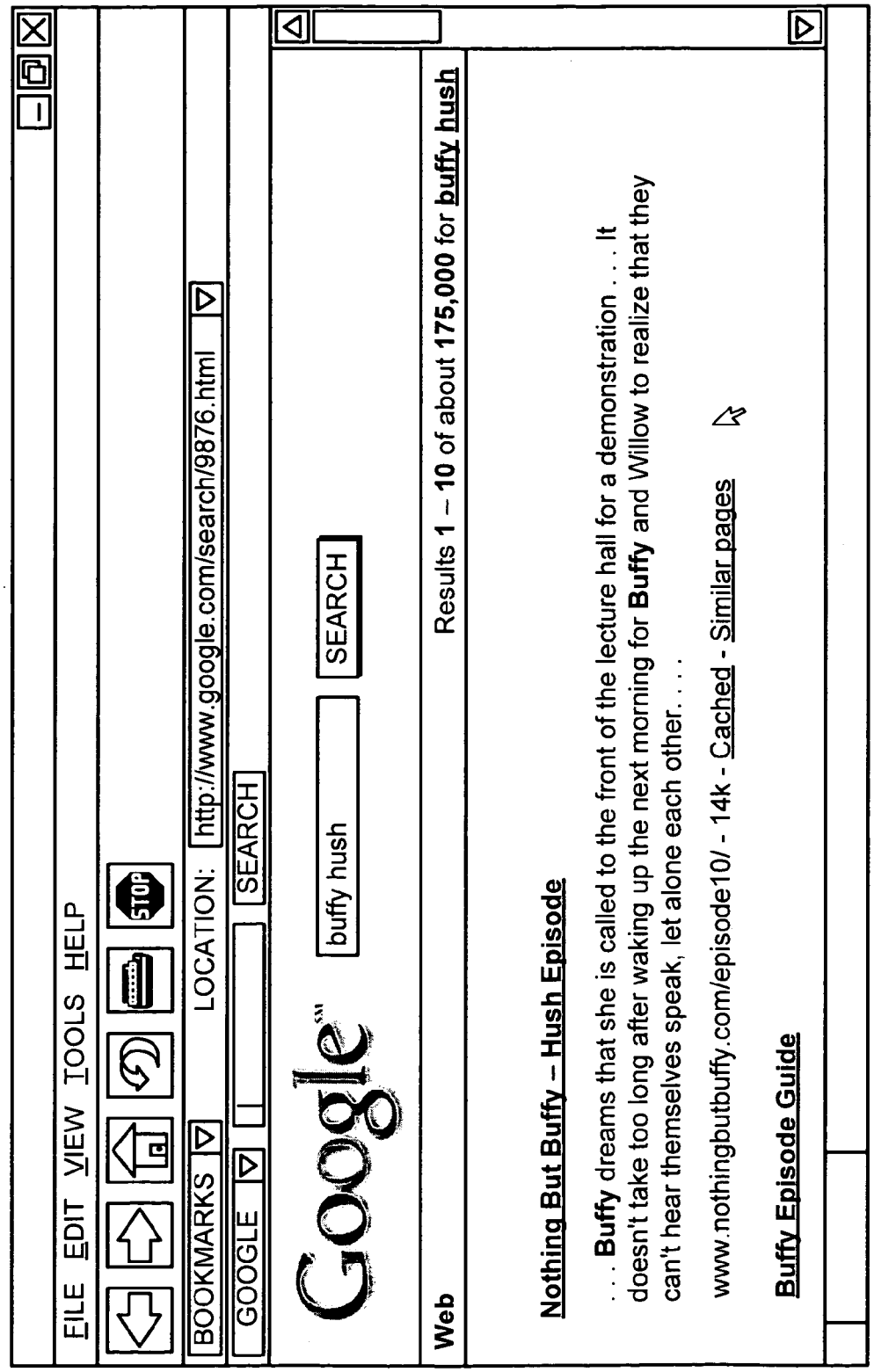
FIGS. 5-9 are exemplary diagrams of information that may be presented to a user.

Processing may begin with a search query being received (block 410). For example, a user might provide one or more search terms of a search query to a search engine interface presented by browser 215 on a client 210. The search engine interface might be provided within a document presented within a browser window provided by browser 215 or on a toolbar or in another place within the browser 215. In any event, browser 215 may send the search query to a search engine, such as search engine 225. As shown in FIG. 5, assume that the user provides a search query "buffy hush" to the search engine interface.

A search may be performed based on the search query to identify search result documents (block 420). The search result documents may include documents that satisfy the search query in some manner, such as by including a search term of the search query. Under the example shown in FIG. 5, search engine 225 may identify documents that include the search term "buffy," the search term "hush," or a combination of the search terms.

A list of search results may be formed based on the identified search result documents (block 430). For example, scores may be determined for each of the search result documents. In one implementation, the score for a search result document may be based on an information retrieval (IR) score, a link-based score, or a combination of the IR and link-based scores. The IR score for a search result document may be based on the number of occurrences of the search term(s) in the document. The IR score may be adjusted based on where a search term occurs within the document (e.g., title, content, etc.) or based on a characteristic of the search term (e.g., font, size, color, etc.). The IR score may also, or alternatively, be adjusted based on the proximity of the search terms when multiple search terms are present. Yet other techniques for generating or adjusting an IR score for a document are known to those skilled in the art. The link-based score for a search result document may be based on the number and/or quality of links to or from the search result document. Several techniques exist for determining the link-based score of a document.

In one implementation, the search result documents may be ranked (e.g., sorted) based on their scores and presented as a list of search results (block 430). The list of search results may be provided as a hypertext markup language (HTML) document, similar to search results provided by existing search engines. Alternatively, the search results may be provided according to another format, such as in the form of an extensible markup language (XML) document. As shown in FIG. 5, assume that two of the search result documents correspond to documents entitled "Nothing But Buffy—Hush Episode" and "Buffy Episode Guide."

The list of search results may be presented to the user via, for example, a browser window of browser 215. The information associated with a search result may include a title, a snippet, an address, and/or various links associated with the search result document corresponding to the search result. The title may identify the search result document or a portion of the search result document and, when selected, may cause the search result document to be presented. As shown in FIG. 5, the title of one of the search result documents includes "Nothing But Buffy—Hush Episode." The snippet may include a small text excerpt from the search result document. In one implementation, the snippet may include all or part of a sentence or all or part of two (or more) sentences. As shown in FIG. 5, the snippet for the Nothing But Buffy—Hush Episode document includes two text excerpts from the document.

The address may identify the network address (e.g., uniform resource locator (URL) address) of the search result document. As shown in FIG. 5, the address for the Nothing But Buffy—Hush Episode document includes "www.nothingbutbuffy.com/episode10." The various links may permit other information to be presented or other action(s) to be performed. As shown in FIG. 5, the various links may include a "Cached" link that may permit a cached version of the search result document to be presented, and a "Similar pages" link that may permit other documents similar to the search result document to be presented.

At some point, the user may desire additional information regarding one of the search result documents that the user might not be able to get from the little amount of information contained in the snippet. For example, the text excerpt of the snippet may contain an out-of-context text excerpt and if the snippet were a little longer it might be sufficient for the user to determine whether the corresponding search result document is what the user is seeking before investing the time to actually access the search result document.

Figure 6:
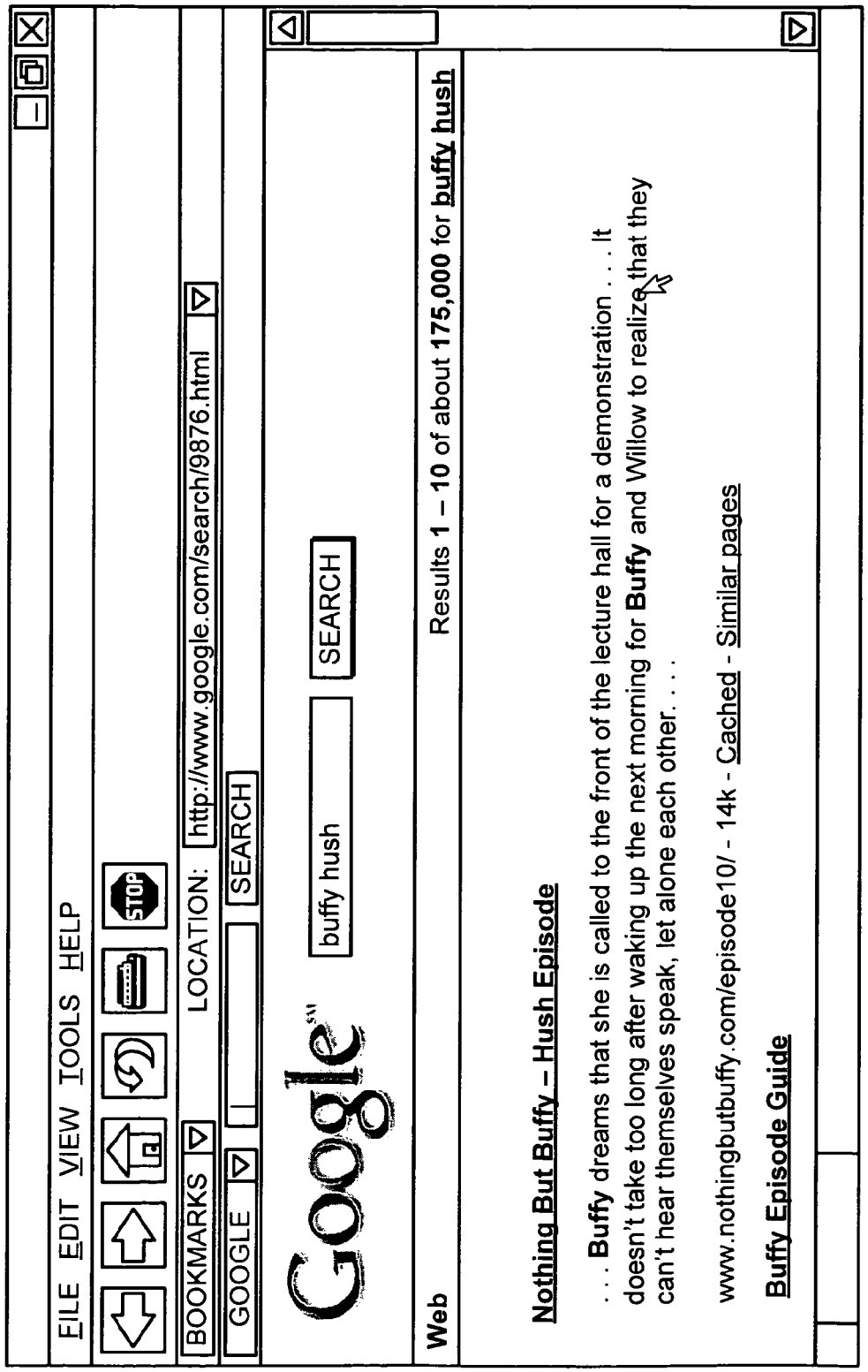

If the user desires additional information regarding a search result document, the user might select the snippet. In one implementation, selection of a snippet might include clicking on the snippet using a pointing device, such as a mouse. In another implementation, selection of a snippet might include a mouse-over event, such as placing a cursor of a pointing device over the snippet for a predetermined amount of time. If the snippet includes multiple text excerpts, the user might select one of the text excerpts to obtain additional information (context) regarding that text excerpt. As shown in FIG. 6, assume that the user selects the second text excerpt.

If the snippet is selected (block 440—YES), an expanded snippet may be provided (block 450). An expanded snippet may include the text excerpt of the snippet with additional text located in proximity to the text excerpt in the search result document, such as text before and/or after the text excerpt. In one implementation, the additional text may include a predetermined amount of text, such as a predetermined number of terms, before and/or after the text excerpt in the search result document. In another implementation, the additional text may be more intelligently selected. For example, the additional text may include all (or less than all) of the text preceding the text excerpt to a beginning or end of a structural component (e.g., paragraph, table entry, section, etc.) in which the text excerpt occurs in the search result document. Alternatively, or additionally, the additional text may include a previous and/or following structural component based on the structural component in which the text excerpt occurs in the search result document.

In a first implementation, browser 215 may detect selection of the snippet. Browser 215 may generate a request for the expanded snippet and send the request to a server, such as server 220. Server 220 generate the expanded snippet based on text from the search result document and send the expanded snippet to browser 215. In a second implementation, server 220 may provide expanded snippets for one or more of the search result documents when server 220 provides the list of search results to browser 215. In this case, the expanded snippets may be generated and embedded within the list of search results and cached by client 210. In a third implementation, browser 215 may prefetch an expanded snippet for one or more of the search results before the user actually requests it. For example, browser 215 may present the list of search results and automatically send a request for an expanded snippet for a set of the search result documents (without waiting for selection of a snippet by the user). Alternatively, browser 215 may detect a cursor associated with a pointing device moving over the snippet and automatically send a request for an expanded snippet for the corresponding search result (in anticipation that the user might actually select the snippet). The expanded snippet(s) may be cached in anticipation that the user might actually request it/them.

An advantage of the first and third techniques is that the list of search results can be formed without the need to generate expanded snippets for one or more of the search results, which may never be requested by the user. Another advantage of the first technique is that the amount of bandwidth and processing needed for the search would be less than the second and third techniques because only expanded snippets actually requested by the users are generated/provided. An advantage of the second and third techniques is that an expanded snippet can be presented quickly to the user since it has already been cached. The particular technique that is implemented may be based on network and/or system constraints, but could be user-configurable.

Figure 7:
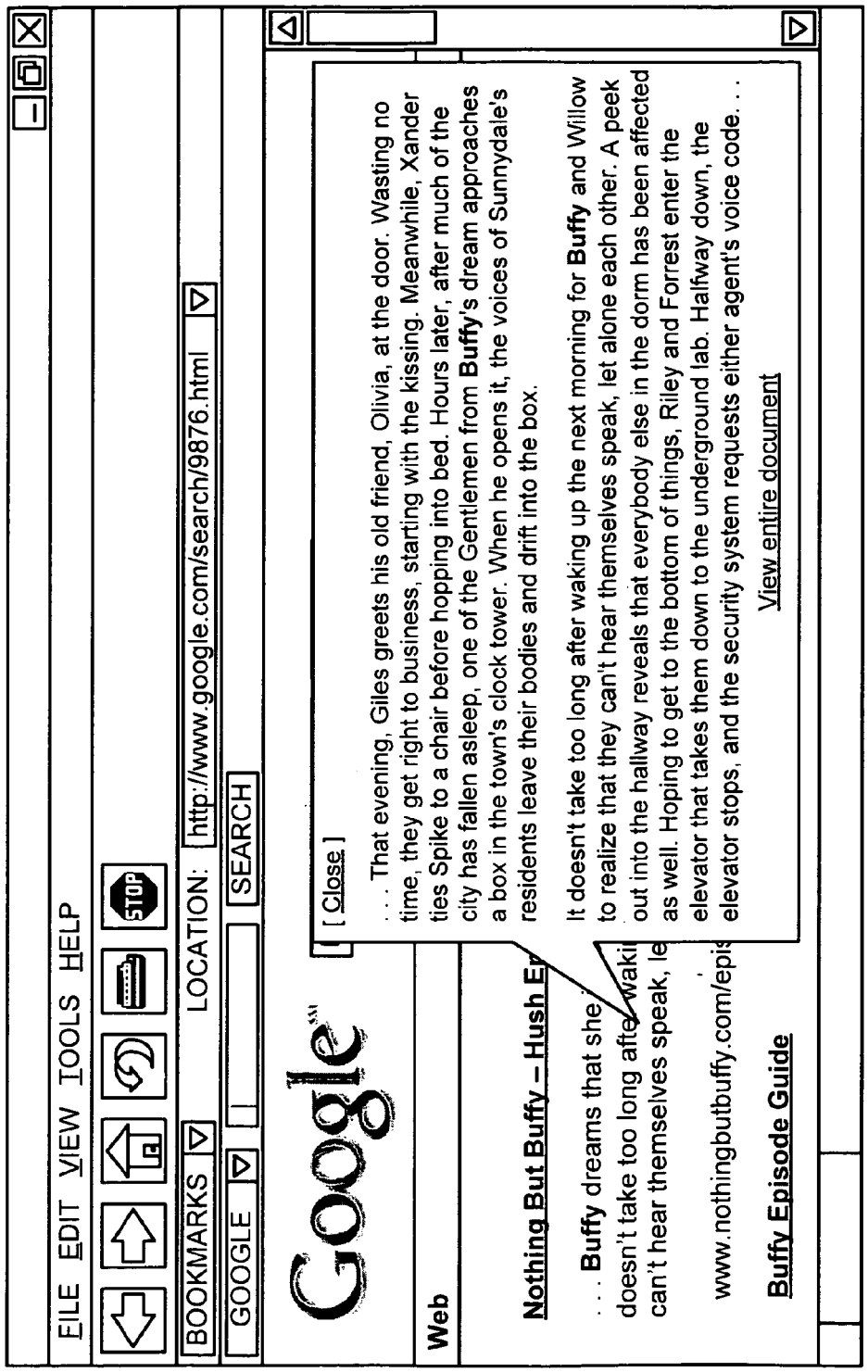
Figure 8:
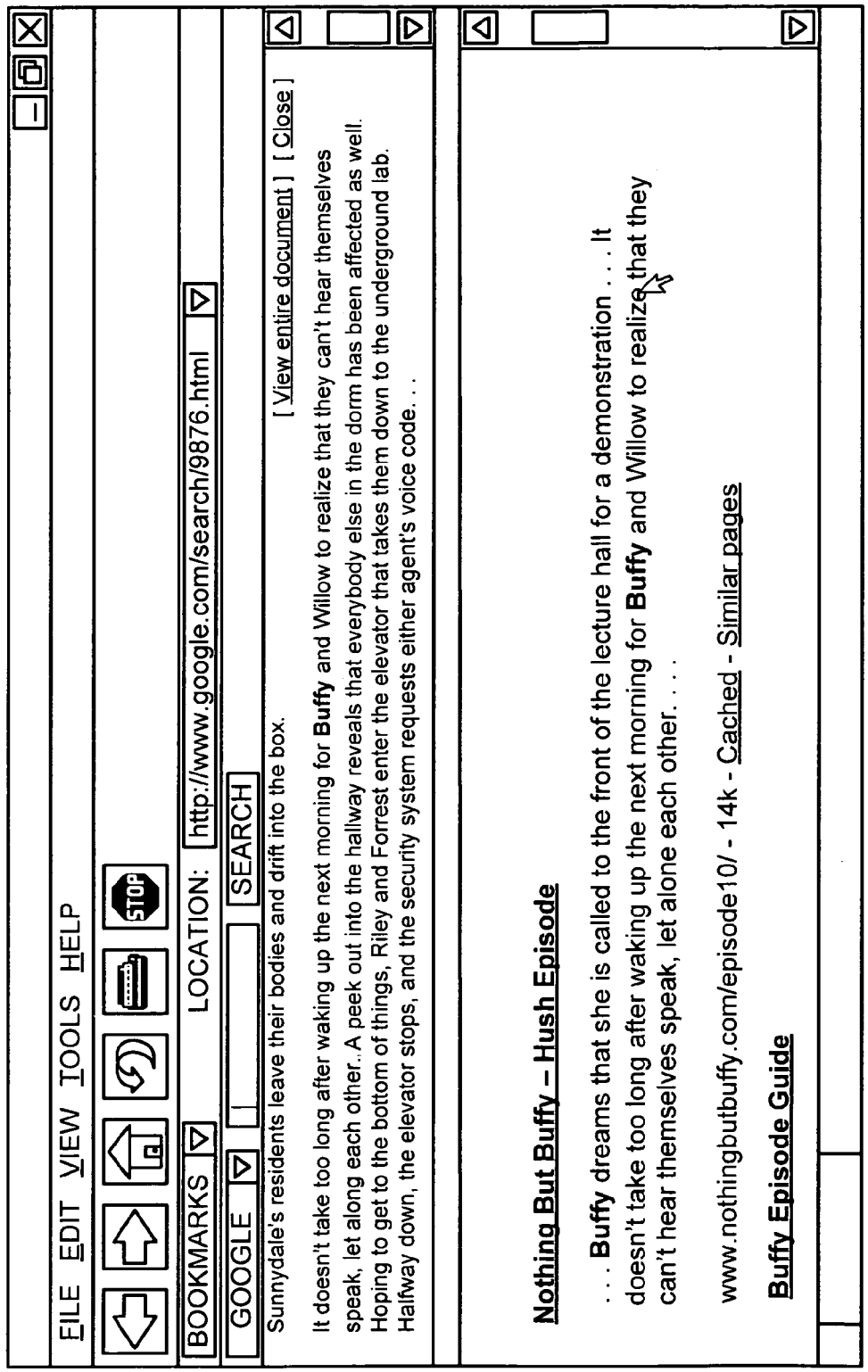
Figure 9:
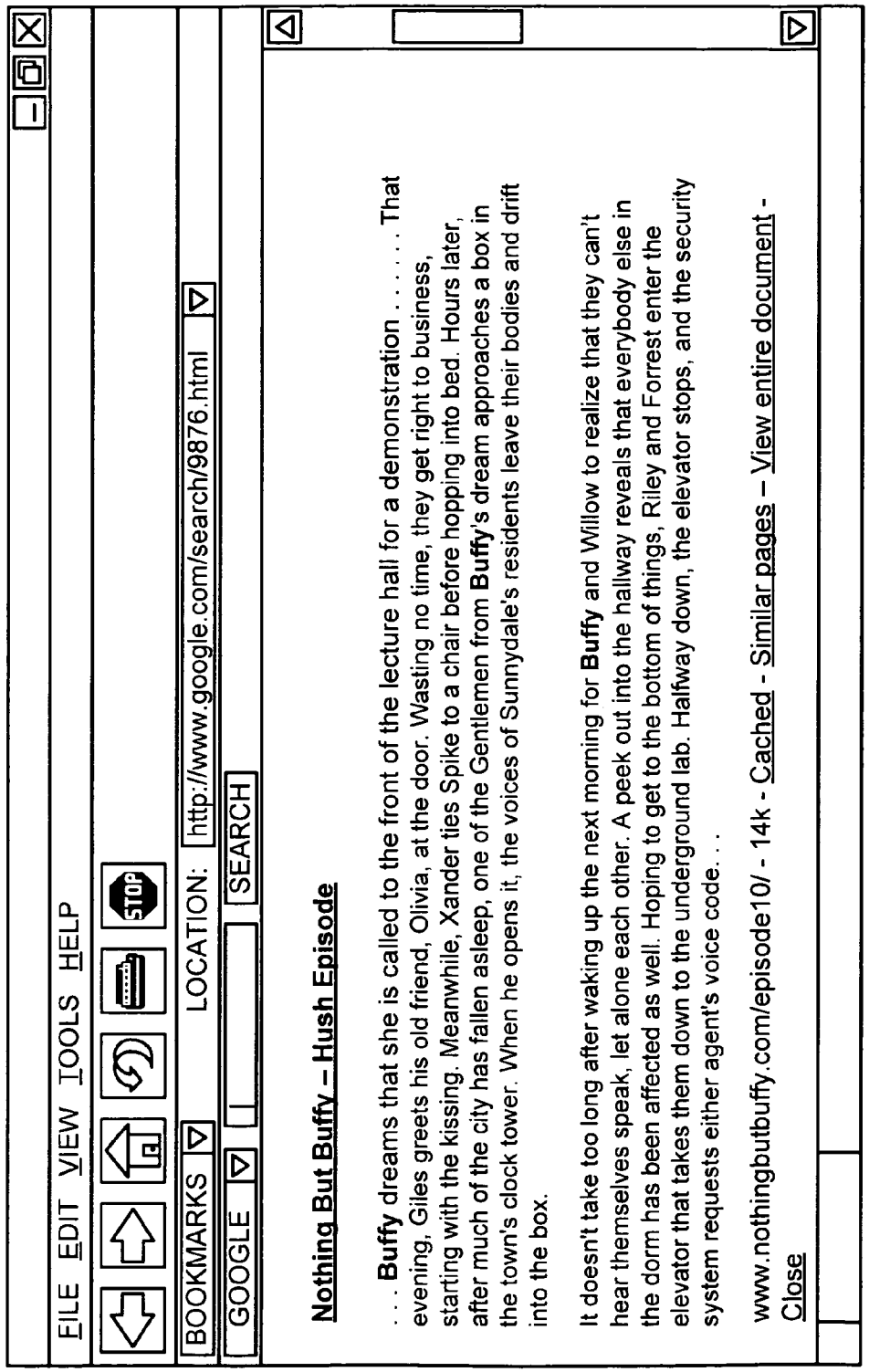

The expanded snippet may be presented within a snippet box associated with the list of search results. In one implementation, the snippet box may take the form of a small overlay that may be superimposed over the search results, such as shown in FIG. 7. In another implementation, the snippet box may take the form of a frame that is presented in connection with the list of search results, such as shown in FIG. 8. As further shown in FIGS. 7 and 8, the text excerpt originally in the snippet might be visually distinguished in some manner (e.g., highlighted, bolded, etc.) to identify it within the expanded snippet. Alternatively, the expanded snippet may be presented inline within the list of search results. For example, the list of search results may be represented such that the search result for which the expanded snippet was requested may be changed to include the expanded snippet in place of (or in addition to) the snippet originally presented with the search result, such as shown in FIG. 9. As further shown in FIG. 9, the text excerpt originally in the snippet might be visually distinguished in some manner to identify it within the expanded snippet.

The expanded snippet may permit the user to access the entire search result document. As shown in FIGS. 7-9, the expanded snippet might include a "view entire document" link that, when selected, may cause the corresponding search result document to be retrieved.

In addition, or alternatively, the expanded snippet may permit the user to remove the expanded snippet and, thus, return to the original list of search results. As shown in FIGS. 7-9, the expanded snippet might include a "close" link that, when selected, may cause the expanded snippet to be removed. In the example of FIGS. 7 and 8, selection of the close link may cause the snippet box to disappear. In the example of FIG. 9, selection of the close link may cause the original list of search results to be re-presented, such as shown in FIG. 5.

CONCLUSION

Implementations consistent with principles of the invention may selectively provide an expanded snippet to permit a user to more intelligently choose which search result document to access.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

Also, exemplary user interfaces have been described with respect to FIGS. 5-9. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by a device, a list of search results,
   where a particular search result, in the list of search results, includes a link and a snippet of text, where the link specifies a search result document, and
   where the snippet of text is obtained from text in the specified search result document;
   receiving, by the device, a request associated with selection of the snippet of text,
   where receiving the request associated with the selection of the snippet of text includes receiving a request associated with detecting a cursor being placed over an area associated with the particular search result;
   providing, by the device and based on the received request, an expanded snippet of text that includes a portion of the snippet of text and additional text from the text in the specified search result document,
   where the expanded snippet of text comprises less than all of the text in the specified search result document, and
   where the expanded snippet of text is provided for display, within one of an overlay or a frame, with the list of search results; and
   providing, by the device, an option for removing the expanded snippet of text,
   where the particular search result is presented without the expanded snippet of text based on selection of the option for removing the expanded snippet of text.

2. The method of claim 1, where providing the expanded snippet of text includes:
   visually distinguishing the portion of the snippet of text within the expanded snippet of text.

3. The method of claim 2, where the expanded snippet of text includes an entirety of the snippet of text, and
   where providing the expanded snippet of text further includes:
   visually distinguishing the entirety of the snippet of text within the expanded snippet of text,
   where the entirety of the snippet of text is visually distinguished in a first format, and
   where the portion of the snippet of text is further visually distinguished in a second format that is different than the first format.

4. The method of claim 1, where providing the expanded snippet of text includes:
   providing the expanded snippet of text in visual proximity to the particular search result.

5. The method of claim 1, where the expanded snippet of text is provided for display within the overlay,
   the method further comprising:
   providing an option for accessing an entirety of the specified search result document,
   where the option for accessing the entirety of the specified search result document is provided within the overlay, and
   where the entirety of the specified search result document is provided when the option for accessing the entirety of the specified search result document is selected.

6. The method of claim 1, where the particular search result further includes another snippet of text,
   the method further comprising:
   receiving a request associated with selection of the other snippet of text; and
   providing, based on receiving the request associated with selection of the other snippet of text, another expanded snippet of text that includes a portion of the other snippet of text and additional text from the text in the specified search result document.

7. The method of claim 1, where the additional text includes a particular quantity of text from the text in the specified search result document, and
   where text, of the particular quantity of text, at least one of:
   directly precedes the snippet of text in the specified search result document, or
   directly follows the snippet of text in the specified search result document.

8. The method of claim 1, where the expanded snippet of text substantially fills the one of the overlay or the frame.

9. A system comprising:
   a memory to store instructions; and
   a processor to execute the instructions to:
   provide a list of search results,
   where a particular search result, in the list of search results, includes a link and a snippet of text,
   where the link specifies a search result document, and
   where the snippet of text is obtained from text in the specified search result document,
   receive a request associated with selection of the snippet of text,
   where the request is associated with a cursor being placed over an area associated with the particular search result,
   provide, based on the received request, an expanded snippet of text that includes a portion of the snippet of text and additional text from the text in the specified search result document,
   where the expanded snippet of text comprises less than all of the text in the specified search result document, and
   where the expanded snippet of text is provided for display with the list of search results, and
   provide an option to remove the expanded snippet of text,
   where the expanded snippet of text is removed based on selection of the option to remove the expanded snippet of text.

10. The system of claim 9, where the processor is further to obtain the expanded snippet of text prior to receiving the request associated with the cursor being placed over the area associated with the particular search result.

11. The system of claim 9, where the expanded snippet of text is at least one of:
    superimposed on the list of search results,
    provided in a frame with the list of search results, or
    provided inline within the list of search results.

12. The system of claim 9, where the expanded snippet of text is superimposed on the list of search results, the expanded snippet of text being provided within an overlay,
    where the snippet of text is included in at least one of a paragraph or a section of the specified search result document,
    where the additional text includes text, in the at least one of the paragraph or the section, other than the snippet of text, and
    where the snippet of text and the additional text substantially fill the overlay.

13. The system of claim 9, where the expanded snippet of text includes an entirety of the snippet of text, and
    where, when providing the expanded snippet of text, the processor is to:
    visually distinguish, in a first format, the entirety of the snippet of text within the expanded snippet of text, and further visually distinguish, in a second format, the portion of the snippet of text within the expanded snippet of text,
where the second format is different than the first format.

14. The system of claim 9, where the expanded snippet of text is provided within an overlay, and
where the overlay includes at least one link to the specified search result document.

15. A computer-readable memory device comprising:
one or more instructions, which when executed by at least one processor of one or more computer devices, cause the at least one processor to provide a list of search results,
where a particular search result, in the list of search results, includes a link and a snippet of text,
where the link specifies a search result document, and
where the snippet of text is obtained from text in the specified search result document,
one or more instructions, which when executed by at least one processor of the one or more computer devices, cause the at least one processor to receive a request associated with selection of the snippet of text,
where the request is associated with a cursor being placed over an area associated with the particular search result,
one or more instructions, which when executed by at least one processor of the one or more computer devices, cause the at least one processor to provide, based on the received request, an expanded snippet of text that includes a portion of the snippet of text and additional text from the text in the specified search result document,
where the expanded snippet of text comprises less than all of the text in the specified search result document, and
where the expanded snippet of text is provided for display with the list of search results, and
one or more instructions, which when executed by at least one processor of the one or more computer devices, cause the at least one processor to provide an option to remove the expanded snippet of text,
where the list of search results is presented without the expanded snippet of text based on selection of the option to remove the expanded snippet of text.

16. The computer-readable memory device of claim 15, where the particular search result further includes another snippet of text,
the computer-readable memory device further comprising:
one or more instructions to receive a request associated with selection of the other snippet of text; and
one or more instructions to provide, based on receiving the request associated with the selection of the other snippet of text, another expanded snippet of text that includes a portion of the other snippet of text and additional text from the text in the specified search result document.

17. The computer-readable memory device of claim 15, where the expanded snippet of text is provided within an overlay,
the computer-readable memory device further comprising:
one or more instructions to provide, within the overlay, an option to access an entirety of the specified search result document,
where the entirety of the specified search result document is provided when the option to access the entirety of the specified search result document is selected.

18. The computer-readable memory device of claim 15, where the additional text includes a particular quantity of text from the text in the specified search result document, and
where text, of the particular quantity of text, at least one of:
directly precedes the snippet of text in the specified search result document, or
directly follows the snippet of text in the specified search result document.

19. The computer-readable memory device of claim 15, further comprising:
one or more instructions to obtain the expanded snippet of text prior to receiving the request associated with the cursor being placed over the area associated with the particular search result; and
one or more instructions to obtain another snippet of text, associated with another text excerpt, prior to receiving a request associated with detecting a cursor being placed over an area associated with another search result, in the list of search results, that corresponds to the other text excerpt.

20. The computer-readable memory device of claim 15, where the expanded snippet of text includes an entirety of the snippet of text, and
where the one or more instructions to provide the expanded snippet of text include:
one or more instructions to visually distinguish, in a first format, the entirety of the snippet of text within the expanded snippet of text, and
one or more instructions to further visually distinguish, in a second format, the portion of the snippet of text within the expanded snippet of text,
where the second format is different than the first format.

21. The computer-readable memory device of claim 15, where the snippet of text is included in a paragraph or a section of the specified search result document,
where the additional text includes text, in the paragraph or the section, other than the snippet of text and text in another paragraph or another section of the specified search result document,
where the other paragraph or other section precedes or follows the paragraph or the section in the specified search result document,
where the expanded snippet of text is provided for display within an overlay, and
where the snippet of text and the additional text substantially fill the overlay.

* * * * *